US005205712A

United States Patent [19]

Hamilton

[11] Patent Number: 5,205,712
[45] Date of Patent: Apr. 27, 1993

[54] VARIABLE PITCH FAN GAS TURBINE ENGINE

[75] Inventor: Paul U. Hamilton, Palos Verdes Estates, Calif.

[73] Assignee: Allied-Signal Inc., Morris Township, Morris County, N.J.

[21] Appl. No.: 700,371

[22] Filed: May 13, 1991

[51] Int. Cl.⁵ .............................................. B64C 11/44
[52] U.S. Cl. ...................................... 416/155; 416/160; 416/162; 416/168 A
[58] Field of Search .................. 416/3, 147, 151, 155, 416/160, 162, 164, 170 R, 1, 168 A

[56] References Cited

U.S. PATENT DOCUMENTS

| | | |
|---|---|---|
| 2,370,135 | 2/1945 | Berliner . |
| 2,370,167 | 2/1945 | Hoover et al. ................ 416/162 |
| 2,488,392 | 11/1949 | Forsyth . |
| 2,491,172 | 12/1949 | Forsyth ........................ 416/155 |
| 2,612,228 | 9/1952 | Forsyth . |
| 3,866,415 | 2/1975 | Ciokajilo . |
| 3,900,274 | 8/1975 | Johnston et al. . |
| 3,904,315 | 9/1975 | Schwartz . |
| 3,922,852 | 12/1975 | Drabek . |
| 3,994,128 | 11/1976 | Griswold, Jr. et al. . |
| 4,021,142 | 5/1977 | Violette . |
| 4,061,440 | 12/1977 | Belliere . |
| 4,124,330 | 11/1978 | Barnes . |
| 4,591,313 | 5/1986 | Miyatake et al. ............. 416/155 |

FOREIGN PATENT DOCUMENTS

| | | |
|---|---|---|
| 712882 | 11/1943 | Fed. Rep. of Germany . |
| 3406634 | 2/1984 | Fed. Rep. of Germany . |
| 568728 | 12/1977 | U.S.S.R. ........................ 416/162 |

Primary Examiner—John T. Kwon
Assistant Examiner—James A. Larson
Attorney, Agent, or Firm—Terry L. Miller; Hugh P. Gortler; Robert A. Walsh

[57] ABSTRACT

A gas turbine engine for aircraft propulsion includes a variable pitch fan, pitch change of which is effected by providing a small D.C. excitation current to a selected one of two non-rotating field coils dependent upon the direction of pitch change desired. The field coils each form the static part of respective polyphase A.C. alternators, and the rotating armatures of the alternators connect to respective separate stator windings of a compound polyphase A.C. reversible induction motor rotating with the fan. An armature of the motor is relatively rotatable and couples with the fan blades to pivotally vary their pitch angle. An A.C. current is available from the non-excited alternator field coil, and may be rectified and controlled for use as the D.C. excitation current. Thus, all energy requirements of the pitch change apparatus may be extracted from the rotor of the fan engine.

14 Claims, 4 Drawing Sheets

VARIABLE PITCH FAN GAS TURBINE ENGINE

BACKGROUND OF THE INVENTION

This invention relates to a variable pitch fan for a gas turbine engine and, more particularly, to actuation apparatus changing fan pitch of a variable pitch fan gas.

DESCRIPTION OF THE PRIOR ART

Those who provide gas turbines for powering aircraft are constantly engaged in finding ways to improve the efficiency of such gas turbines so that greater thrust is available for powering the aircraft at little or no increase in weight in the gas turbine itself. One way to accomplish this result which has been widely recognized is the use of a gas turbine having a fan driven by a core engine. Further efficiency is obtained by providing such a fan with variable pitch blading so that the flow characteristics of the fan may be varied in order to optimize fan operation at all modes of flight of the aircraft.

In gas turbines having such variable pitch blading, the use of a hydraulic actuator or actuators for providing the necessary actuation force is common in the prior art. A severe problem encountered when using hydraulic actuators is the danger of leakage if the integrity of the hydraulic system is not maintained or if sealing is faulty and hydraulic fluid enters the interior of the gas turbine and is exposed to the high temperatures present there.

The leakage of hydraulic fluid presents the danger of a fire in the gas turbine which can either spread to the aircraft in which the gas turbine is mounted or cause a malfunction of the gas turbine and therefore a degradation of the amount of propulsive force supplied to the aircraft. This can be serious in the normal flight mode and particularly so in flight modes such as take-off and landing where power is critical. In addition, the leakage of even small amounts of hydraulic fluid can contaminate the engine bleed air that provides pressurized fresh air to the aircraft cabin.

The problem of the leakage of hydraulic fluid can be approached in a variety of ways. As to the integrity of the system, expensive and elaborate measures may be taken to prevent the entrance of hydraulic fluid to the gas turbine interior. This is the only way of alleviating the problem since 100 percent reliability cannot be attained with present technology. Sealing may be made more elaborate also, but its performance cannot be guaranteed either. The best solution is to eliminate the use of hydraulic actuators for activating a variable pitch fan of a gas turbine engine.

The new family of high bypass, large diameter, turbofan engines recently introduced into airline service have proven an economical and convenient means of propulsion for today's wide bodied aircraft which cruise subsonically. The high bypass engines have also demonstrated noise levels which are significantly lower than those of previous generation engines due to the reduced jet velocities of the airflow pressurized by the fan while thrust levels have been increased as a direct result of the increased airflow mass passing through the fan. Even further increases in performance efficiency could be obtained if the effective fan speed of these large high bypass engines could be varied to meet different engine operating requirements as dictated by the flight mission.

One means of varying the fan speed of a bypass turbofan engine without changing the rotational speed of the core engine is through the use of variable pitch fan blading. Such blading may be varied to cater to varying flight conditions and may even be varied to reverse pitch for complete thrust reversal after landing. However, in spite of these advantages, the use of variable pitch fan blading has not proved entirely satisfactory even when considered for the earlier generation for smaller fan engines due to the high centrifugal forces under which the variable pitch blading must be actuated.

To optimize both take-off performance and cruise performance, it is desirable to vary the pitch of the fan blades of current high bypass fan propulsion engines and of future still larger fan propulsion engines. These future large fan propulsion engines are expected to satisfy extended twin operations (or ETOP) requirements. These ETOP's requirements will provide large twin engine aircraft capable of extended over-water operation. Because of their size and over-water operation rating, the ETOP's aircraft will require a new family of still-larger fan propulsion turbine engines. In addition, a variable pitch fan of this next generation fan propulsion turbine engine may also be used to produce reverse thrust during landings. Other reversing devices could then be eliminated. Accordingly, a variable pitch thrust fan is currently favored by several propulsion system manufacturers.

Providing a pitch-change apparatus for a ducted thrust fan is complicated by several factors. The apparatus should be light-weight and compact since it will be mounted in the fan hub. The hub rotates at high speed to obtain the required high by-pass and pressure ratios and, hence, centrifugal growth must be considered. The large number of blades in close proximity to one another at the hub and the large blade angles through which each blade must be turned to go from forward to reverse pitch place stringent requirements on the size of the apparatus and the magnitude of the displacements and forces produced by the apparatus. Non-linear variations in the blade twisting moments in the range from forward to reverse pitch through feathered pitch must be accommodated by the control loads carried by the apparatus.

SUMMARY OF THE INVENTION

The present invention provides a fan propulsion engine with pitch change actuation apparatus. A central through passage is available for working fluid passage, for engine structure, or for both.

The pitch change mechanism according to the present invention requires for its operation no physical contact between stator and rotor of the turbine engine. In other words, the slip rings and electrical contacts, or brushes, found in some conventional electrically-driven pitch change systems are absent from the present inventive pitch change system.

Further to the above, and with greater particularity, the present invention provides a fan propulsion turbine engine including a variable-pitch fan, wherein a pair of axially-spaced annular polyphase alternating current (AC) generators or alternators are cooperatively carried by the non rotating and rotating engine structures. Each of the pair of polyphase generators includes a respective annular direct current (D.C.) excitable stator or field coil. The field coils are in radial and axial congruence (but without physical contact) with respective annular polyphase armatures carried by a rotor of the turbine engine. Each of the polyphase generators is electrically connected to the stator of a single double-winding annular polyphase motor. This stator is not rotational relative to the generator armatures, although all three are carried by a rotor of the turbine engine, and are rotatable together. An annular induction motor armature is relatively rotatably carried by the rotor of the turbine engine. This motor armature is reversibly driven by the motor stator, and is geared by a high-ratio annular gear train and interposed linkage to the root of each fan blade. The gear train may be resistant to back driving, so that no brake on the actuator mechanism is required to hold a selected pitch position.

BRIEF DESCRIPTION OF THE DRAWING FIGURES

Figure 1:
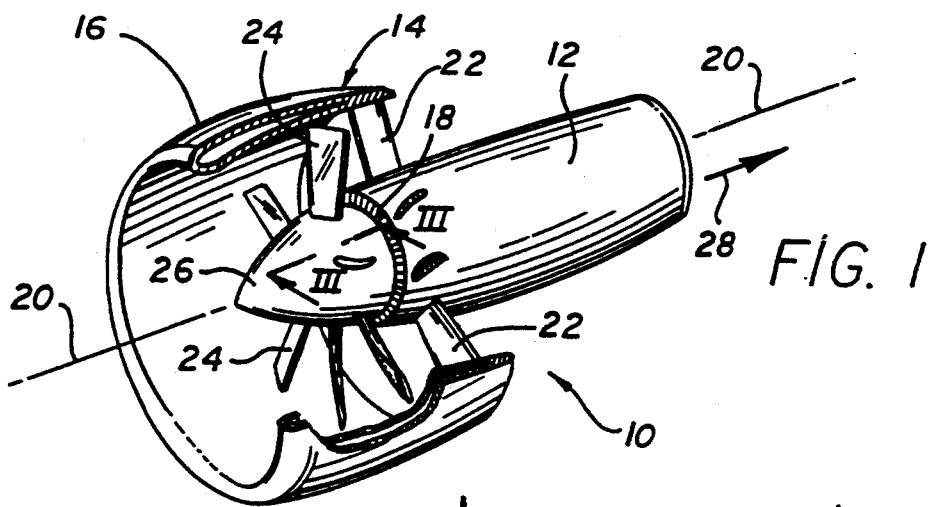
FIG. 1 is a perspective view of a fan propulsion turbine engine having a variable pitch fan section embodying the present invention.
Figure 3A:
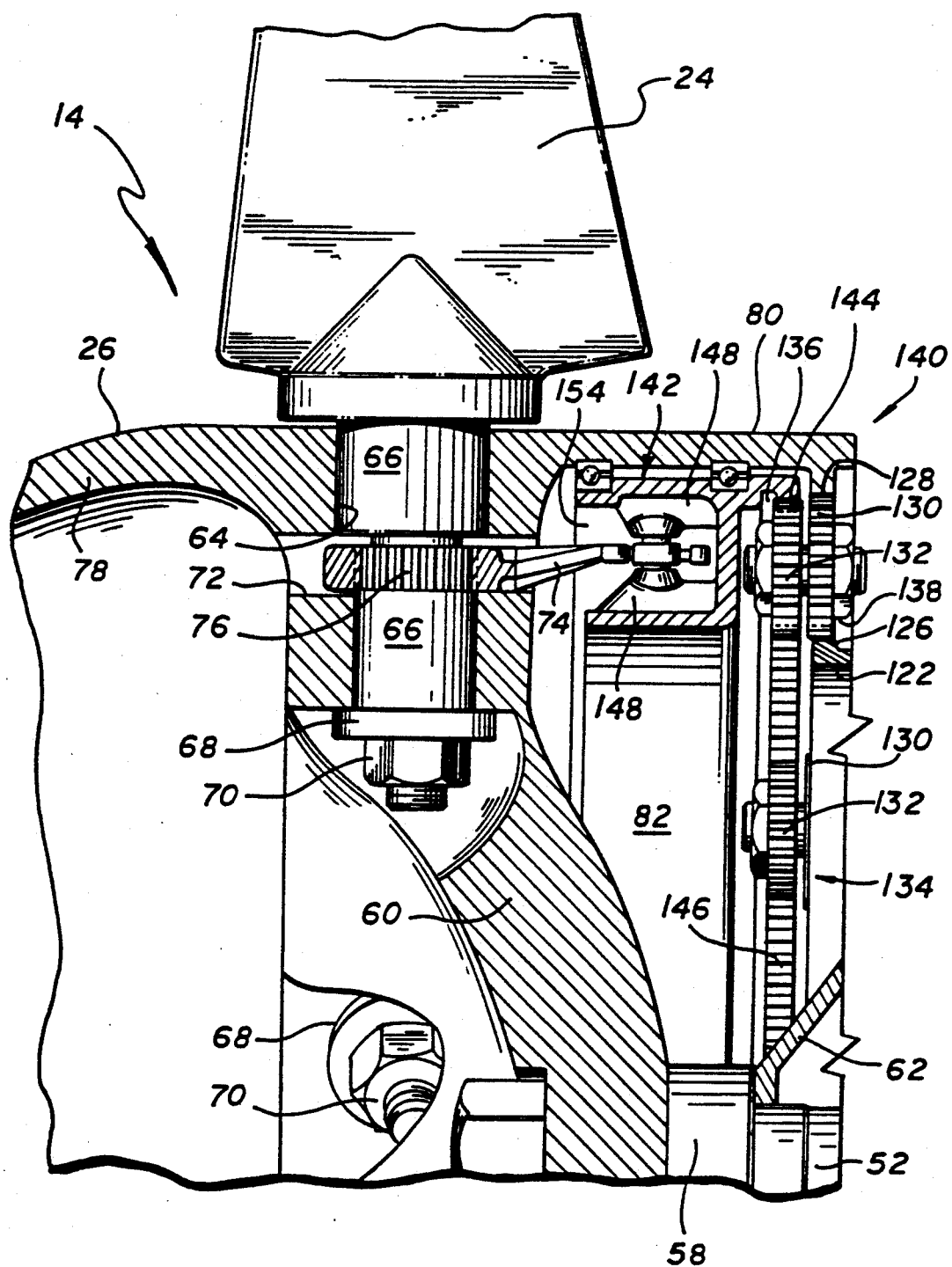
Figure 3B:
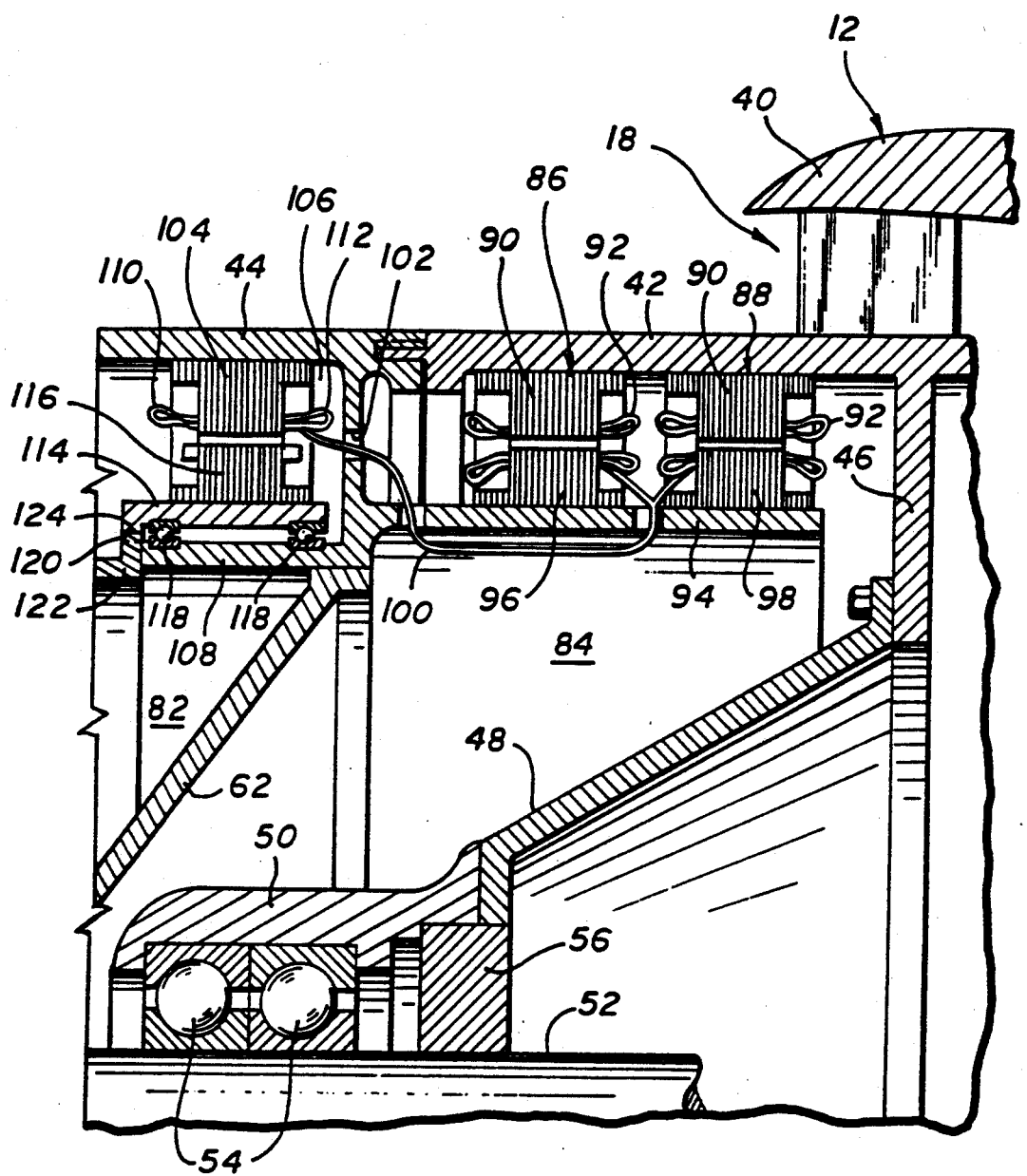
Figure 4:
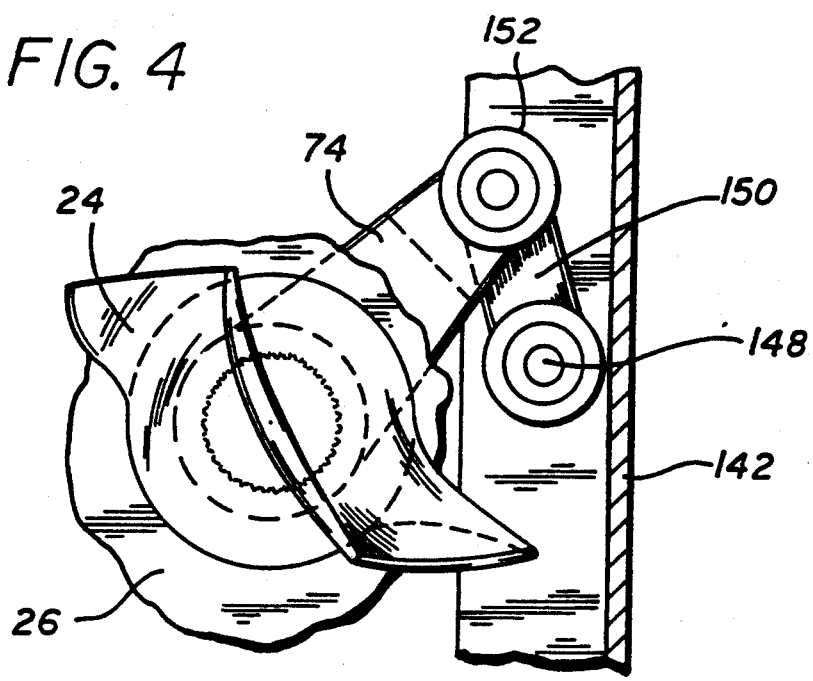
Figure 5:
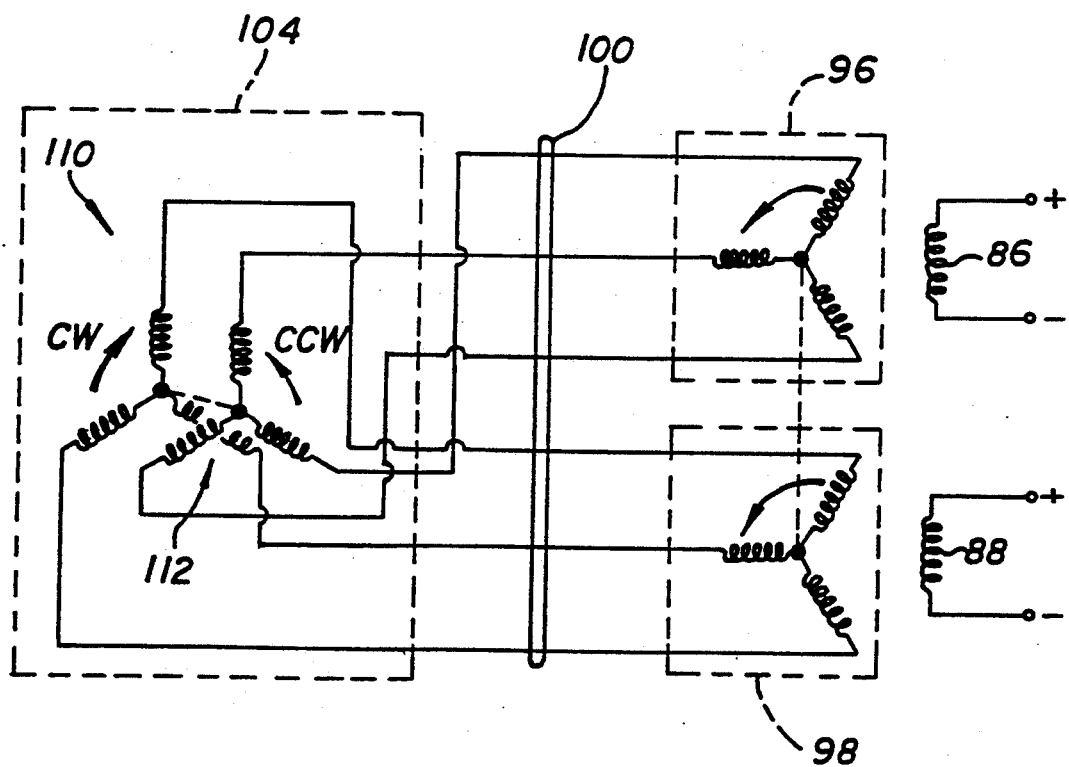

FIGS. 3A and 3B present a fragmentary longitudual cross sectional views taken generally along the line III—III of FIG. 1;

FIG. 4 provides a partial cross sectional view of a linkage between a fan blade and planetary gears; and FIG. 5 provides an electrical schematic of apparatus embodying the invention.

DETAILED DESCRIPTION OF THE PREFERRED EMBODIMENT

FIG. 1 shows a fan propulsion turbine engine unit of the type in which the pitch-change apparatus of the present invention is employed. The propulsion unit generally designated 10, has utility as an aircraft propulsor and has a turbine-type power plant 12 on which a thrust fan 14 and a by-pass duct 16 are mounted. The fan 14 is connected to the forward end of the power plant adjacent the compressor inlet 18 and is rotatably driven by the power plant. For example, the fan may be driven by a separate gas turbine in the engine or the fan may be driven jointly with the compressor.

The by-pass duct 16 is supported over the fan 14 and is mounted coaxially of the hub and engine axis 20 by means of a series of stand-off struts 22 to provide an annular by-pass between the power plant 12 and the trailing portion of the duct. The variable pitch blades 24 of the fan 14 extend from the hub 26 into close proximity to the inside surface of the duct 16 to insure efficient displacement of air through the fan into both the compressor inlet 18 and the annular by-pass. The number of variable pitch blades 24 mounted on the hub 26 depends upon the size of the propulsion unit, and fans with a dozen or more blades are not uncommon.

The turbine engine 12 includes a core engine flow path extending from inlet 18 to an aft opening, wherein the intake air is pressurized, mixed with fuel and combusted, and the combustion products are expanded through turbine means before the combustion products are exhausted via the aft opening, as indicated by arrow 28. Conventionally, the turbine engine 12 includes a compressor section inducting fan-pressurized ambient air via inlet 18, and discharging this air further pressurized to a combustor plenum. A combustor is located in the combustor plenum and receives a flow of fuel along with pressurized air to sustain combustion providing a flow of high-temperature pressurized combustion products. The pressurized combustion products flow from the combustor to a turbine section for expansion toward ambient pressure. The turbine section extracts mechanical shaft power from the combustion products, and drives the thrust fan 14. In as much as the above-described internal features of turbine engine 12 are conventional, they are well-known to those skilled in the pertinent arts, and are not herein further depicted nor described.

Figure 2A:
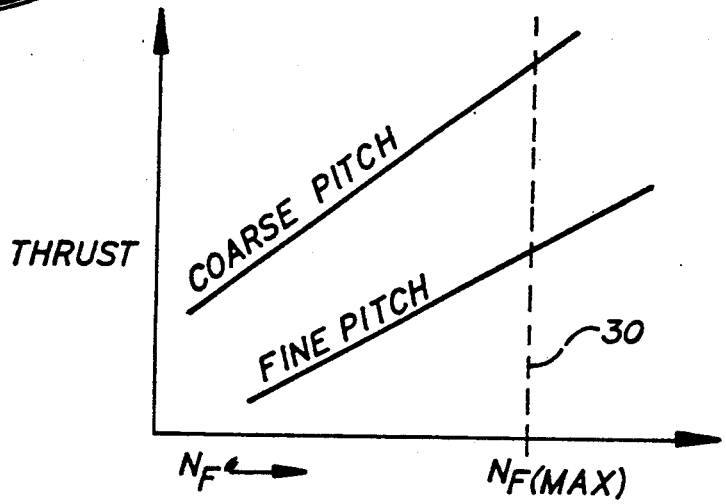
FIG. 2A and 2B are graphs of the relationship between fan rotational speed and thrust produced by the fan for various pitch settings, and the relationship between flight speed and speed-specific thrust for various pitch settings.
Figure 2B:
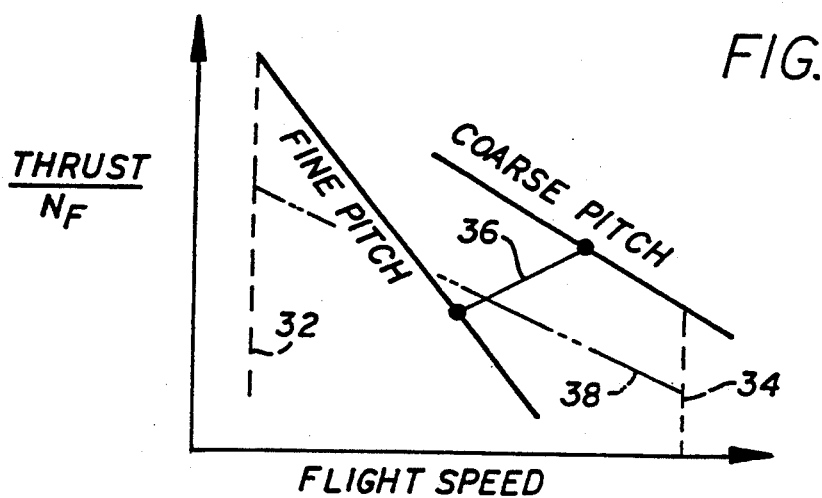

Turning now to FIGS. 2A and 2B, further background information in favor of the variable pitch fan thrust engine is graphically presented. FIG. 2A depicts the relationship between the rotational speed NF of the thrust fan 14 and the available thrust at an arbitrary forward speed. Generally, the arbitrary forward speed should be considered to be greater than zero speed, and the fan operation to be in a regime avoiding stalling of the fan blades 24. Thus, it is seen that at a limit value of NF, depicted by dashed line 30 a higher level of thrust may be obtained from the fan 14 if the blades 24 are set to a course pitch position.

However, for take off and low speed climbing operation of the unit 10, operation of the fan 14 in course pitch position could result in stalling of the blades 24, or in the power absorption of the fan exceeding the driving power available from the engine 12. FIG. 2B indicates at line 32 an exemplary take off and low speed climb condition of operation of unit 10. As seen at line 32, the total thrust, considering the engine 12 to be operating at NF (MAX), is greater with the blades 24 in a fine pitch position.

However, as aircraft altitude and flight speed increase, toward a typical cruise condition (line 34 on FIG. 2B), the available thrust in the fine pitch position of blades 24 decreases markedly. Thus, change of the pitch position of blades 24 to a coarse pitch position (along line 36) is indicated as the aircraft continues to climb and accelerate. By way of comparison, phantom line 38 on FIG. 2B depicts the speed-specific thrust versus flight speed characteristic which might be expected from an otherwise comparable but conventional high bypass turbofan engine with a fixed-pitch fan. This engine will not provide as great a take off and acceleration thrust at low flight speeds (line 32). Nor will the conventional engine provide as great a cruise flight thrust. In order to provide the thrust required for an equal flight cruise speed, the conventional engine will necessarily be operated at a greater corrected speed. Understandably, the conventional engine will have a greater cruise thrust specific fuel consumption, and will result in a comparatively limited range for the aircraft.

Viewing now FIG. 3B, it will be seen that the unit 10, and engine 12 thereof includes a housing 40 defining the inlet 18. Housing 40 includes a cylindrical or tubular non-rotational casing portion 42 extending forwardly of the inlet 18 to the hub 44 of rotational thrust fan 14. Within the casing portion 42 an annular partition 46 extends inwardly to support a forwardly extending conical bearing support wall 48 which at its forward termination carries a bearing and seal housing 50. Aft of the partition 46 and wall 48 is disposed a speed reduction gear box (not shown) conventionally driven by a turbine section of the engine 12, and from which forwardly extends a fan drive shaft 52. The fan drive shaft 52 is journaled in bearings 54 and cooperates with a sealing member 56, both of which are carried in the housing 50.

Reference is now made to FIG. 3A. At its forward end the fan drive shaft 52 defines a flange 58 to which is secured the structural and operational components of the thrust fan 14. Forwardly of flange 58, the latter carries a structural disk member 60 and a cone-shaped rearwardly extending support wall member 62. The structural disk member 60 extends radially outwardly, and at its outer periphery defines a circumferentially arrayed plurality of radially extending bores 64, only one of which is visible in FIG. 3A. A respective root portion 66 of one of the fan blades 24 is rotatably received in each of the bores 64. For purposes of simplicity, the root portions 66 are depicted as cooperatively defining simple journal bearing surfaces, and also as being radially retained by a simple thrust washer 68 and nut 70. However, those ordinarily skilled in the art will recognize that the fan blades 24 could be secured by the more common angular contact ball or roller bearings seating in appropriately configured seats on the structural disk 60. At each of the bores 64, the disk 60 defines an axially extending through slot 72 wherein receives an actuating lever 74. The root portion 66 and actuating lever 74 each define cooperating spline surfaces, generally referenced at 76 which drivingly couple these components for pivotal movement together on disk 60.

Forward of the fan blades 24, the disk 60 carries a spinner member, generally referenced with the numeral 78, and the exterior surface of which is seen in FIG. 1. Aft of the fan blades 24, the disk 60 in cooperation with support wall 62 carries an annular or tubular casing, generally referenced with the numeral 80. For purposes of convenience, the casing 80 is depicted in FIG. 3 as integral with the disk 60. However, those ordinarily skilled in the mechanical arts will recognize that the casing 80 may be a separate part. Importantly, the casing 80 extends rearwardly of the fan blades 24 generally at a diameter equal with the casing 42, and outwardly defines the aft surface of the hub 44. In other words, the outer surfaces of the hub 44 are cooperatively defined first by the spinner 78 forward of the blades 24, by the disk 60 at the blades 24, and by casing 80 aft of the blades 24. The hub 44 outwardly provides an advantageous aerodynamic surface for operation of the blades 24, and leads to the inlet 18. Within the hub 44, disk 60, wall 62 and casing 80 cooperatively define an annular chamber 82.

Reference is once again made to FIG. 3B. Aft of the chamber 82, support wall 62, and wall 48 cooperate with casing 42 to define another annular cavity 84. Within the cavity 84, the casing 42 non-rotatably supports a pair of axially spaced annular direct current (D.C.) excitable field coils 86, 88. The field coils 86, 88 each include a laminated magnetic iron pole piece 90, and a winding 92 of electrical conductor wound on the pole piece 90. Casing 80 defines an axially extending collar or ring portion 94 extending rotationally into the cavity 84. Upon its outer periphery, the collar 94 carries a pair of axially spaced annular polyphase generator armatures 96, 98. The armatures 96, 98 are radially congruent with and spaced from the field coils 86, 88, so that no physical contact takes place therebetween even though the items 86-96, and 88-98 are magnetically in communication with one another. From the armatures 96, 98, separate electrical connections extend in a cable 100 through an aperture 102 from the cavity 84 into the cavity 82. Those skilled in the art will understand that an environmental seal (not shown) may be provided at aperture 102 about cable 100.

Within the cavity 82, the cable 100 extends to an annular polyphase motor stator 104 which is carried by casing 80. The stator 104 is non rotational relative to the casing 80, although both rotate together as parts of the thrust fan hub 26. It will be seen that the stator 104 is disposed within a leftwardly-opening C-shaped recess 106 cooperatively defined by the outer wall of the casing 80, and on annular L-shaped web wall 108. The collar 94 extends axially into cavity 84 from the wall 108, and support wall 62 joins wall 106 adjacent the radially extending and axially extending legs thereof. The stator 108 carries dual windings, further described herein below, and generally referenced on FIG. 3B with numerals 110, 112.

Disposed rotationally upon the axially extending leg of wall 105 is a ring 114 carrying an annular induction motor armature 116. The ring 114 is rotationally carried by a pair of axially spaced antifriction bearings 118, and at its left end defines a radially inwardly disposed annular spline surface 120. Engaging with the spline surface 120 so as to be carried by ring 114 is an annular torque transfer member 122. The torque transfer member 122 defines a matching spline surface 124 at its right-hand end. Reference is once again made to FIG. 3A. At its left end, the torque transfer member 122 defines an annular radially outwardly disposed sun-gear surface 126. In radial alignment with the sun gear surface 126 of torque transfer member 122, the casing 80 defines a radially inwardly disposed annular ring gear surface 128. Between and in mesh with the annular sun gear 126 and annular ring gear 128 is disposed a circumferentially arrayed plurality of planet gear members 130. The planet gear members 130 are each coupled with a planet gear member 132 of slightly different diameter to form a compound planet, generally referenced with the numeral 134. Compound planet gears 134 are guided by a pair of spaced apart annular ring members 136, 138, which cooperatively form a planet gear carrier, referenced with numeral 140.

In order to complete the compound planetary gear reduction including elements 122-140, the casing 80 rotatably carries an annular torque output or unison ring member 142, which is channel-like or C-shaped in cross section. The unison ring member 142 includes an axially extending web portion 144 extending outwardly of the planet gears 132, to there carry an annular ring gear 146. Ring gear 146 meshes with planet gears 132 to be driven in rotation at a high ratio of speed reduction and torque multiplication when the torque transfer member 122 is driven by armature 116.

Viewing now FIG. 4, it will be seen that in order to provide a mechanical connection between the unison ring 142 and each of the fan blades 24, the ring 142 carries a circumferentially arrayed plurality of anchor bosses 148. A respective link member 150 having hemispherical joints therein at each end couples at one end to the actuating lever 74 and at the other end to the anchor boss 148. Further consideration of FIG. 4 will reveal that in order to provide for the greatest angular displacement of the fan blades 24, while also providing a compact and light weight mechanism, the distal end 152 of link 150 is receivable into the channel space 154 (see FIG. 3A) of the unison ring 142.

FIG. 5 presents a schematic representation of the electrical and magnetic connection of the field coils 86, 88, armatures 96, 98, cable 100, and windings 110, 112 on stator 104. When a D.C. excitation is applied to one of the field coils 86, 88, a polyphase electrical current is magnetically induced in the respective windings of the armatures 96 or 98. For purposes of illustration only, the polyphase electrical current is depicted as being of 3-phase type. However, polyphase current of other than 3-phase may be employed, if desired. Importantly, the polyphase current from armatures 96, 98 is of opposite phase rotation or is connected to the windings 110, 112 of motor stator 104 in opposite phase rotation. The result is that each of the field coil-armature pairs 86-96, and 88-98 defines a separate polyphase alternator each connected to a single reversible compound induction motor having dual windings defined by elements 104, 110, 112, and 114. Only one alternator provides an excitation current to the motor at any given time.

Those skilled in the electrical arts will recognize that the compound stator 104 is magnetically coupled with the armature 116 so that dependent upon the phase rotation of the current received at the stator 104, the armature 116 will be induced to rotate in one direction or the other. Those skilled in the electrical arts will also recognize that the stator windings 110, 112 on stator 104 have at least some mutual inductance therebetween. When polyphase current of a selected phase rotation is supplied to one of the windings 110, 112 on stator 104, a polyphase current of like phase rotation is induced into the other winding thereon. This induced current is then conducted to the one of the armatures 96, 98, the field coil of which is not receiving D.C. excitation. Because the phase rotation of this induced counter polyphase current conducted to the non-excited armature 96 or 98 is the same as the rotation of the armatures 96, 98, an increased frequency A.C. current will appear in the non-excited field coil 86 or 88 of that armature. That is, the induced current will have a frequency higher than the pole-passage frequency resulting from rotation of the armatures 96, 98. The applicant optionally provides for safely limiting this A.C. counter current by connecting a conventional high-impedance bleed-off circuit to the non-excited one of the field coils 86, 88. Because such a high-impedance bleed off circuit is conventional, it is not depicted herein.

As an alternative, the A.C. counter current which appears at the non-excited one of the field coils 86, 88 when the other field coil is D.C. excited to effect a pitch change of blades 24, may be rectified and controlled to supply all or part of the D.C. excitation to the other of the field coils 86, 88. By this expedient, a pitch change of the blades 24 may be initialed by supplying a small D.C. "kick off" current to one of the field coils 86, 88, and utilizing the counter A.C. current from the other field coil, rectified and controlled, to maintain the pitch changing D.C. excitation of the one field coil. In this way no external electrical power supply source is necessary to power the pitch change apparatus of the present invention.

Further to the above, those skilled in the electrical arts will recognize that, in operation, sufficient residual magnetism will remain in the operating components of the apparatus that a low level A.C. current will be available at the field coils 86, 88. This low level A.C. current, again rectified and controlled, can provide the D.C. "kick off" current needed for operation of the pitch change apparatus. In other words, the present invention as described above, can provide a regenerative self-excited electrical machine mechanically driving pitch change of the fan 14, with all necessary energy extracted from the unit 10 itself. Only electrical switch gear or current control apparatus is needed to control the self-powered pitch change apparatus of the present invention.

Recall now the structure depicted and described by reference to FIGS. 3A, 3B and 4. During operation of the engine 12 application of D.C. excitation current to one of the field coils 86, 88 results in the motor armature 116 rotating in a selected direction relative to hub 26. Importantly, the level of energy required to be controlled externally is only that needed for excitation of one of the field coils 86, 88. The rotation of the hub 26 relative to the stationary structure of the engine 12 provides the prime power source for the pitch change system of the present invention. Rotation of armature 116 drives the fan blades 24 in a selected pitch change direction via torque transmission member 122; the compound planetary gear reduction including elements 126-140, and 144; unison ring 142; links 150; and actuating levers 74. As mentioned, the motor including armature 116 is reversible; direction of rotation depends upon which one of the field coils 86, 88 receives D.C. excitation. However, because of the high ratio of speed reduction and torque multiplication provided by the compound planetary speed reduction as well as static and centrifugally-induced frictions within the apparatus, the armature 116 can not be back driven by torques effective on the fan blades 24. That is, the speed reduction mechanism is inherently a 'no-back' device. Thus, when no pitch change movement of the fan blades 24 is desired, the circuits of field coils 86 and 88 are simply opened, and the pitch change apparatus remains static, rotating in unison with hub 26.

Importantly, it will be seen upon further consideration of the pitch change mechanism embodying the present invention that the annular nature of the entire mechanism is advantageous in a turbine engine. That is, the central space of the pitch change mechanism allows the radial support for blades 24 to be configured, if desired, as a complete disk, better supporting the imposed centrifugal and torque transmission loads. Also, the bearings 54 can be placed axially closer to the transverse plane of the blades 24 than would be possibly conventionally. The present invention avoids the use of hydraulic actuators and complex mechanizations within the rotor of a turbine engine. Further, the stationary and rotating structure of the engine 12 are coupled magnetically and, therefore, without contact. Finally, the cavity 82 may effectively contain any lubricant which is necessary for the relatively moving mechanical components of the apparatus. For this purpose, the simple expedient of sealing the forward end of slots 72, and providing rotational seals at the blade roots 66 should suffice to prevent escape of the lubricant.

I claim:

1. Pitch change apparatus for a variable-pitch fan of a fan propulsion turbine engine, said pitch change apparatus comprising a first and second axially spaced alternator, each alternator having a stator carried by a housing of said engine and a rotor rotated by a rotatable portion of said engine, a motor axially spaced from said alternators and receiving excitation current from a selected one of said alternators, said motor including an annular stator rotated by said engine rotatable portion, and an annular motor armature rotatable relative to said engine rotatable portion, speed reduction means, carried by said rotatable engine portion, having an input rotated by said motor armature and an output rotatably driving a torque output member independently rotatably carried by said engine rotatable portion, and linkage means coupling said torque output member with fan blades of said fan to alter the pitch angle thereof in response to rotation of said torque output member.

2. The apparatus of claim 1 wherein said stators of said alternators are selectively direct current excited and wherein said rotors of said alternators are of polyphase type.

3. The apparatus of claim 2 wherein said motor is an induction type with two separate stator windings electrically coupled to said respective rotors of said alternators.

4. The apparatus of claim 5 wherein said two separate stator windings define a mutual inductance therebetween, whereby polyphase A.C. current applied to one of said stator windings induces a polyphase A.C. current in the other of said two stator windings.

5. The apparatus of claim 3 wherein said selected alternator provides polyphase current in response to D.C. excitation of its stator.

6. The apparatus of claim 4 wherein said induced polyphase current results in an A.C. current being induced in a winding of the non-selected alternator.

7. The apparatus of claim 6 wherein said A.C. current induced into said winding of said non-selected alternator is rectified and supplied to said stator of said selected alternator.

8. The apparatus of claim 1 wherein said speed reduction means is of no-back type so that torque from said fan blades cannot back drive said motor armature.

9. The apparatus of claim 8 wherein said speed reduction means is of annular compound planetary configuration.

10. The apparatus of claim 9, wherein said annular speed reduction means includes an annular input sun gear member drivingly connecting with said motor armature, a circumferential array of compound planet gears each meshing at a first gear element thereof on the one hand with said sun gear member and also meshing on the other hand with an annular ring gear member carried relatively nonrotationally by said rotatable portion of said engine, a second gear element of said compound planet gears meshing with a respective ring gear portion of said torque output member to rotationally drive the latter in response to rotation of said input sun gear and gyration of said compound planet gears.

11. The apparatus of claim 1 wherein said linkage means includes a plurality of actuator leves drivingly coupling individually with respective fan blades of said variable-pitch fan, and a link extending pivotally between a distal end of each actuating lever and a respective pivotal anchorage upon said torque output member.

12. The apparatus of claim 11 wherein said torque output member defines an axially opening channel recess and is axially spaced from a transverse plane of rotation of said fan blades, and wherein said actuating levers extend axially toward said torque output member, said distal ends of said actuating levers being received by said channel recess as said levers pivot when said fan pitch is being changed.

13. A propulsion turbine engine having a nonrotational housing journaling a rotational engine rotor thereon, a propulsion thrust fan driven by said turbine engine including a circumferentially arrayed plurality of fan blades pivotally movable about respective radial axes, and apparatus for selectively pivoting said fan blades, said apparatus comprising:

a first and second direct current excited annular polyphase alternator each including a respective annular non-rotational D.C. excited field coil carried by said engine housing; and a respective annular polyphase A.C. alternator armature carried by and rotational with said engine rotor;

an annular compound polyphase reversible induction motor whose stator receives A.C. current from each of said first and second alternators and are carried by and rotate in unison with said engine rotor, said motor further including an annular armature carried by and independently rotational with respect to said engine rotor;

reduction gear train means for coupling said annular motor armature to an annular torque delivery member carried by and rotational independently of said engine rotor; and linkage means coupling said torque delivery member to each one of said pivotal fan blades to pivot said fan blades in response to rotation of said torque delivery member relative said engine rotor.

14. The engine of claim 13 wherein said gear train means includes an annular sun gear member drivingly coupling with said motor armature, a plurality of compound planet gear members meshing both with said sun gear member and with a first ring gear member carried relatively nonrotatably by said engine rotor, and a second ring gear member relatively rotatably carried by said engine rotor for rotation at a reduced speed in response to rotation of said motor armature and drivingly coupling with said linkage means.

* * * * *